UNITED STATES PATENT OFFICE.

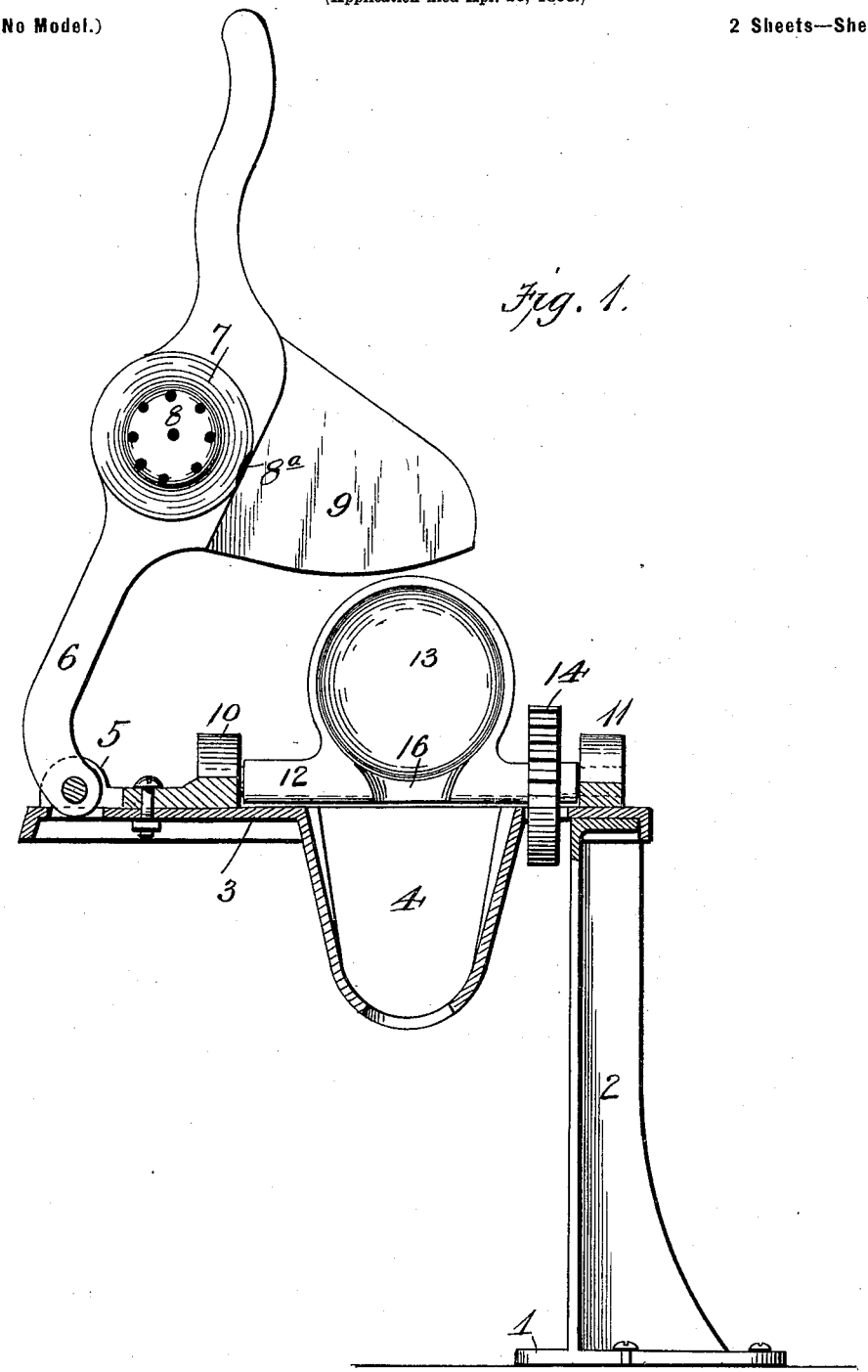

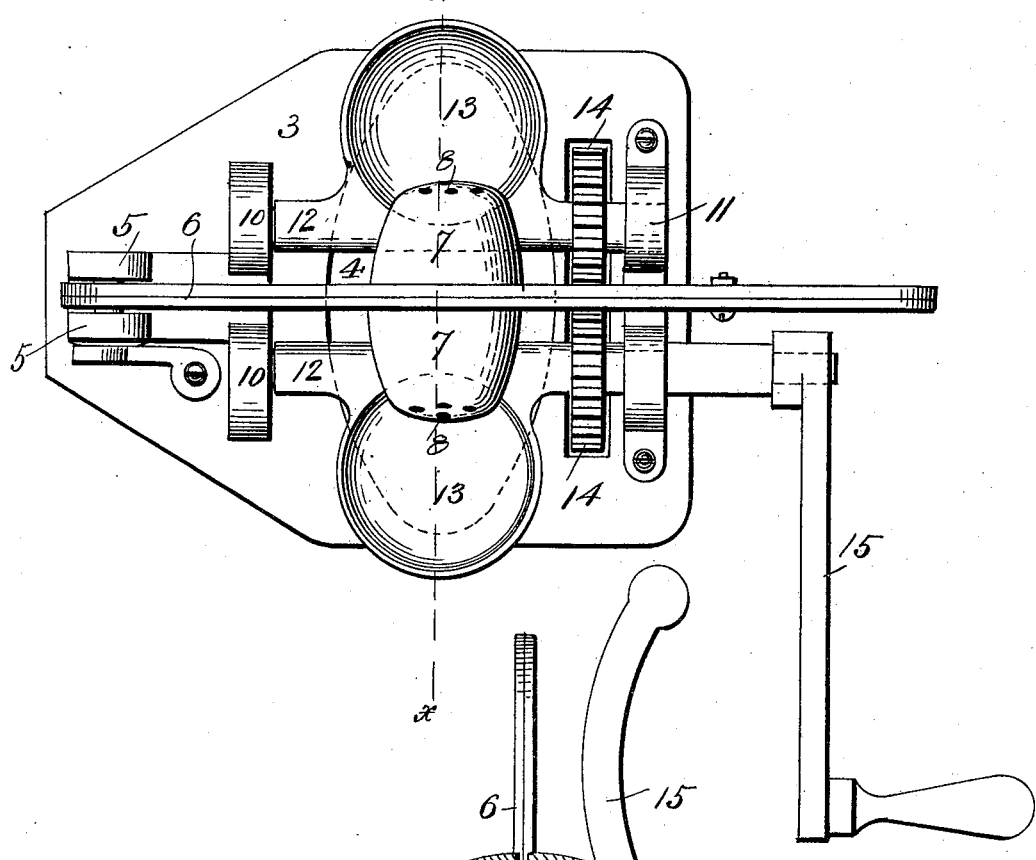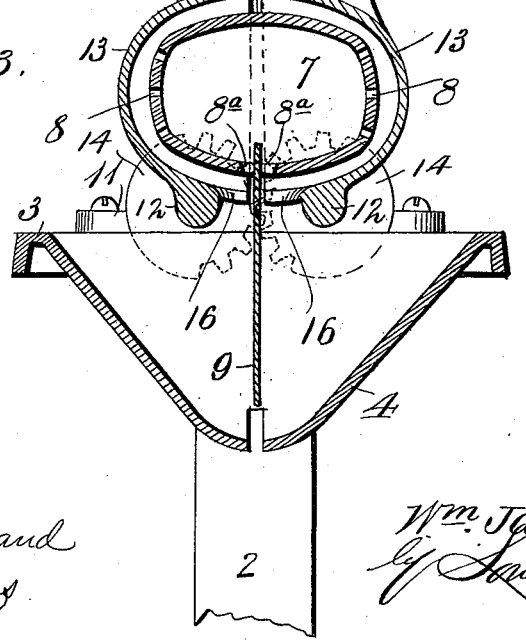

WILLIAM JAQUES, OF ROYERSFORD, PENNSYLVANIA.

LEMON CUTTER AND SQUEEZER.

SPECIFICATION forming part of Letters Patent No. 620,142, dated February 28, 1899.

Application filed April 23, 1898. Serial No. 678,598. (No model.)

*To all whom it may concern:*

Be it known that I, WILLIAM JAQUES, a citizen of the United States, residing at Royersford, in the county of Montgomery and State of Pennsylvania, have invented new and useful Improvements in Automatic Lemon Cutters and Squeezers, of which the following is a specification.

My invention relates to lemon cutters and squeezers by means of which a lemon may be cut in halves and then squeezed to expel the juice in a rapid and efficient manner and without any liability of the seeds falling into the receptacle which receives the juice.

The invention consists in the novel construction and combination of parts hereinafter fully described and claimed.

In the accompanying drawings, Figure 1 is a longitudinal sectional view of a lemon cutter and squeezer constructed in accordance with my invention. Fig. 2 is a plan view. Fig. 3 is a transverse section on the line $x\,x$, Fig. 2.

In the said drawings the reference-numeral 1 designates a base, to which is secured a standard or upright 2, provided with a laterally-extending or horizontal shelf 3, formed with an oblong opening 4. Pivoted to lugs 5 at the outer end of said shelf is a lever 6, provided with a strainer 7, consisting of a globular receptacle having a number of apertures 8 in each end, and with a central hole or holes $8^a$. The numeral 9 designates a downwardly-extending knife secured to said lever, which is adapted to project down through the opening in the shelf. Pivoted to lugs 10 and 11 on said shelf are opposite horizontal rotatable shafts 12, to which are secured two cups or concavo-convex receptacles 13, adapted to be turned upwardly and inwardly to grasp and hold a lemon. These shafts are provided with intermeshing gears 14, and one of the shafts is provided with a handle or crank 15.

The lugs 5 and 10 may be formed integral with each other and secured to the shelf, or they may be formed integral with the shelf itself, as found most convenient or desirable.

It will also be seen that the edges of the cups, at the inner sides thereof, are formed with recesses 16 to allow the ends of a lemon to rest therein and also allow the expressed juice to escape to a receptacle below the shelf.

The operation is as follows: A lemon is placed transversely over the opening in the shelf with the ends resting in the cups 13. The lever is then brought forward and the knife forced downwardly, cutting the lemon in half. The two halves will then rest in the cups, and the latter are brought toward each other by turning the crank 15, which presses the said halves between said cups and the perforated ends of the strainer. The juice will be expressed from said halves by this operation and will be forced through the perforations in the ends of the cups, from whence it will escape through the holes $8^a$ in the same and from thence through the recesses 16 in the cups to a receptacle placed below the opening in the shelf.

Having thus fully described my invention, what I claim is—

1. In a lemon-squeezer, the combination with the base, the upright and the horizontal shelf formed with an opening, of the lever pivoted to said shelf, the hollow strainer secured thereto formed with perforations in its ends and with a central opening in its lower side, the rotatable shafts, the concavo-convex cups secured thereto formed with recesses in the edges and located at the ends of said strainer and means for rotating said shafts, substantially as described.

2. In a lemon-squeezer, the combination with the base, the upright, the horizontal shelf formed with an opening therein, the lever, the hollow strainer formed with perforations in its ends and with a central opening or openings, and the knife secured to said lever, of the rotatable shafts, the cups secured thereto having opposite recesses in the edges and located at the ends of said strainer, and the intermeshing gears, substantially as described.

In testimony whereof I have hereunto set my hand in presence of two subscribing witnesses.

WILLIAM JAQUES.

Witnesses:
HENRY GOSSMAN,
JAMES MULLIN.